(12) United States Patent
Asaoka et al.

(10) Patent No.: US 10,189,396 B2
(45) Date of Patent: Jan. 29, 2019

(54) VEHICLE HEADLAMP CONTROL DEVICE (71) Applicant: TOYOTA JIDOSHA KABUSHIKI KAISHA, Toyota-shi, Aichi-ken (JP)

(72) Inventors: Kazuya Asaoka, Seto (JP); Shinichi Kojima, Nagakute (JP); Kazunori Higuchi, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/316,992

(22) PCT Filed: Jun. 5, 2015

(86) PCT No.: PCT/IB2015/000860
§ 371 (c)(1),
(2) Date: Dec. 7, 2016

(87) PCT Pub. No.: WO2015/189672
PCT Pub. Date: Dec. 17, 2015

(65) Prior Publication Data
US 2017/0120801 A1  May 4, 2017

(30) Foreign Application Priority Data
Jun. 10, 2014 (JP) ................................ 2014-119910

(51) Int. Cl.
B60Q 1/14 (2006.01)
F21S 41/30 (2018.01)
(Continued)

(52) U.S. Cl.
CPC .............. B60Q 1/14 (2013.01); B60Q 1/0011 (2013.01); B60Q 1/143 (2013.01); F21S 41/141 (2018.01); F21S 41/30 (2018.01); F21S 41/675 (2018.01); G06K 9/00604 (2013.01); G06K 9/00791 (2013.01); H04N 7/183 (2013.01); H05B 33/0854 (2013.01); B60Q 2300/056 (2013.01);
(Continued)

(58) Field of Classification Search
None
See application file for complete search history.

(56) References Cited

U.S. PATENT DOCUMENTS 9,090,205 B2 * 7/2015 Nagaoka ................ B60Q 9/008
9,523,473 B2 * 12/2016 Ackermann ........... B60Q 1/085
(Continued)

FOREIGN PATENT DOCUMENTS

DE 102008008883 A1 8/2009
JP 2000-225888 A 8/2000
(Continued)

Primary Examiner — Crystal L Hammond
(74) Attorney, Agent, or Firm — Sughrue Mion, PLLC (57) ABSTRACT A vehicle headlamp control device includes a headlamp that irradiates an area in front of a vehicle, a camera that captures an image of the area in front of the vehicle, a pedestrian detection portion configured to detect a pedestrian in front of the vehicle from an image captured by the camera, and a control portion configured to control the headlamp and cause the headlamp to irradiate the pedestrian so that a given-shaped part that is not irradiated is formed at a location of an eye of the pedestrian, or a given-shaped part irradiated by dimmed light is formed at the location of the eye of the pedestrian.

9 Claims, 4 Drawing Sheets (51) Int. Cl.
*F21S 41/675* (2018.01)
*F21S 41/141* (2018.01)
*B60Q 1/00* (2006.01)
*G06K 9/00* (2006.01)
*H04N 7/18* (2006.01)
*H05B 33/08* (2006.01)
*F21Y 115/10* (2016.01)
*G02F 1/133* (2006.01)
*G02F 1/137* (2006.01)

(52) U.S. Cl.
CPC ....... *B60Q 2300/45* (2013.01); *F21Y 2115/10* (2016.08); *G02F 1/137* (2013.01); *G02F 1/13306* (2013.01)

(56) References Cited

U.S. PATENT DOCUMENTS

| | | | |
|---|---|---|---|
| 2003/0107323 A1* | 6/2003 | Stam | F21S 48/171 315/82 |
| 2003/0147247 A1* | 8/2003 | Koike | B60Q 1/484 362/464 |
| 2004/0105264 A1* | 6/2004 | Spero | B60Q 1/04 362/276 |
| 2006/0023461 A1* | 2/2006 | Knight | B60Q 1/076 362/466 |
| 2007/0193811 A1* | 8/2007 | Breed | B60R 21/01536 180/271 |
| 2008/0013329 A1* | 1/2008 | Takeda | F21K 9/00 362/459 |
| 2009/0254247 A1* | 10/2009 | Osanai | B60Q 1/143 701/36 |
| 2010/0191418 A1* | 7/2010 | Mimeault | B60Q 1/0023 701/36 |
| 2011/0234422 A1* | 9/2011 | Yamashita | B60Q 5/006 340/901 |
| 2012/0127313 A1* | 5/2012 | Ehlgen | B60Q 1/1423 348/149 |
| 2012/0206050 A1* | 8/2012 | Spero | B60Q 1/04 315/152 |
| 2013/0141578 A1* | 6/2013 | Chundrlik, Jr. | H04N 7/181 348/148 |
| 2013/0343071 A1* | 12/2013 | Nagaoka | B60Q 9/008 362/466 |
| 2014/0104051 A1* | 4/2014 | Breed | G06K 9/00791 340/435 |
| 2015/0291081 A1* | 10/2015 | Kojima | B60Q 1/085 362/466 |

FOREIGN PATENT DOCUMENTS

| | | |
|---|---|---|
| JP | 2005-329819 A | 12/2005 |
| JP | 2008-081074 A | 4/2008 |
| JP | 2008-143505 A | 6/2008 |
| JP | 2009-090844 A | 4/2009 |
| JP | 2010-032906 A | 2/2010 |
| JP | 2013-086663 A | 5/2013 |
| JP | 2013-097885 A | 5/2013 |

* cited by examiner

VEHICLE HEADLAMP CONTROL DEVICE

BACKGROUND OF THE INVENTION

1. Field of the Invention

The invention relates to a vehicle headlamp control device.

2. Description of Related Art

A headlamp control device is known, which controls an upper limit irradiation position of a headlamp when a front pedestrian in front of a vehicle is detected, so that the upper limit irradiation position becomes lower than the face of the front pedestrian (for example, Japanese Patent Application Publication No. 2000-225888 (JP 2000-225888 A)). By controlling the upper limit irradiation position of the headlamp so as to be lower than the face of a pedestrian, glare protection for the pedestrian becomes possible.

There is also known a lighting system that irradiates an area in front of a vehicle with near infrared and images the area in front of the vehicle by receiving reflected light of the near infrared, or carries out pulse irradiation of visual light for a period of time that is short enough to prevent a pedestrian from being dazzled, and images an area in front of the vehicle when the pulse irradiation is carried out (for example, Japanese Patent Application Publication No. 2009-90844 (JP 2009-90844 A)). Thus, it is possible to detect a pedestrian in front of a vehicle at night without making the pedestrian dazzled.

However, in the case where a pedestrian in front of a vehicle is detected based on an image captured by a camera, the pedestrian is detected by pattern recognition including image information of a face. Therefore, like JP 2000-225888 A, there are cases where a pedestrian cannot be detected without light irradiation from a headlamp on the face. As a result, when a pedestrian is not detected as stated above, the face of the pedestrian is irradiated by the headlamp, and, once the face of the pedestrian is irradiated, the pedestrian is detected, and the face of the pedestrian is no longer irradiated. This situation is repeated, which can make it impossible to appropriately carry out glare protection for the pedestrian. In short, it may be impossible to achieve both detection of a pedestrian based on an image captured by a camera, and glare protection for the detected pedestrian.

Meanwhile, as stated in JP 2009-90844 A, it is possible to detect a pedestrian in front of a vehicle at night by carrying out near infrared irradiation or pulse irradiation of visual light without making the pedestrian dazzled. However, it is necessary to use a camera that is able to capture an image by receiving near infrared or pulsed light for a very short period of time. In short, it is not possible to achieve both detection of a pedestrian based on an image captured by the camera, and glare protection for the detected pedestrian without changing a basic performance of the camera.

SUMMARY OF THE INVENTION

The invention provides a vehicle headlamp control device that detects a pedestrian in front of a vehicle based on an image captured by a camera, and is able to achieve both detection of a pedestrian and glare protection for the pedestrian without changing a basic performance of the camera when carrying out the glare protection for the detected pedestrian.

According to one embodiment, a vehicle headlamp control device includes a headlamp that irradiates an area in front of a vehicle, a camera that captures an image of the area in front of the vehicle, a pedestrian detection portion configured to detect a pedestrian in front of the vehicle from an image captured by the camera, and a control portion configured to control the headlamp and cause the headlamp to irradiate the pedestrian so that a given-shaped part that is not irradiated is formed at a location of an eye of the pedestrian, or a given-shaped part irradiated by dimmed light is formed at the location of the eye of the pedestrian.

In the vehicle headlamp control device, the pedestrian detection portion may detect the pedestrian in front of the vehicle from the image captured by the camera by performing pattern recognition based on a preregistered pattern image, and an image of a pedestrian, whose eyes are hidden by the given shape part, may be preregistered as the pattern image.

Further, the vehicle headlamp control device may include the control portion configured to cause the headlamp to irradiate the pedestrian so that a sunglasses-shaped part that is not irradiated is formed at the location of the eye of the pedestrian, or a sunglasses-shaped part irradiated by dimmed light is formed at the location of the eye of the pedestrian.

The vehicle headlamp control device includes the control portion configured to cause the headlamp to irradiate the pedestrian so that the given-shaped part that is not irradiated is formed in an iris portion including a pupil in an area of the eye of the pedestrian, or the given-shaped part irradiated by dimmed light is formed in the iris portion including the pupil in the area of the eye of the pedestrian.

In the vehicle headlamp control device, the headlamp may change a light quantity in each irradiation direction within an irradiation range.

In the vehicle headlamp control device, the headlamp may shield light from a light source and forms the given-shaped part that is not irradiated or the given-shaped part that is irradiated by dimmed light.

In the vehicle headlamp control device, the headlamp may be of a mirror element projector type.

In the vehicle headlamp control device, the headlamp may be of a liquid crystal projector type.

In the vehicle headlamp control device, the headlamp may be of a LED matrix type.

The vehicle headlamp control device may include an anti-glare lighting mode as a lighting mode, in which the headlamp is controlled so as to irradiate a whole body of the pedestrian while carrying out glare protection for the pedestrian in front of the vehicle.

According to the above-mentioned embodiment, the vehicle headlamp control device is provided, in which both detection of a pedestrian and glare protection for the pedestrian are achieved without changing basic performance of the camera, when the pedestrian in front of the vehicle is detected based on the image captured by the camera, and the glare protection for the detected pedestrian is performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Forms for carrying out the invention are explained below with reference to the drawings.

Figure 1:
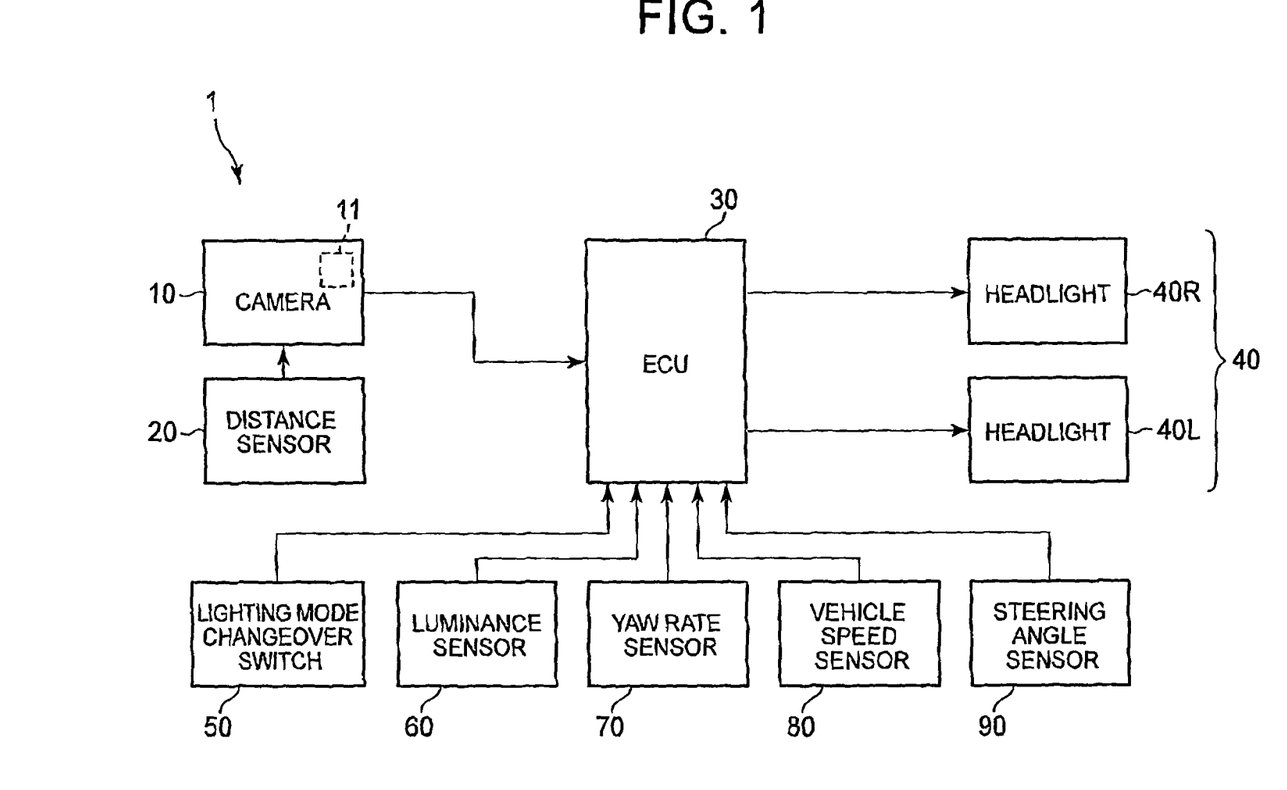
FIG. 1 is a structural view showing an example of a structure of a vehicle headlamp control device according to an embodiment.

FIG. 1 is a structural view showing an example of a structure of a vehicle headlamp control device 1 according to an embodiment.

The vehicle headlamp control device 1 is mounted on a vehicle, and includes a camera 10, a distance sensor 20, an ECU 30, headlamps 40, a lighting mode changeover switch 50, a luminance sensor 60, a yaw rate sensor 70, a vehicle speed sensor 80, a steering angle sensor 90, and so on.

The camera 10 is imaging portion imaging an area in front of a vehicle, and includes an image processing portion 11. The camera 10 may be mounted on any location of a vehicle, where an area in front of the vehicle is able to be imaged. For example, the camera 10 may be arranged in a cabin in an upper part of a windshield in terms of protection against dust and water. Unless the operation of the camera 10 is stopped, the camera 10 continuously captures, for example, 30 frames of images per second, and sends the images to the image processing portion 11 every time the images are captured.

The image processing portion 11 carries out processing to detect a pedestrian in front of a vehicle based on images of an area in front of the vehicle captured by the camera 10. To be specific, the image processing portion 11 detects a pedestrian by pattern recognition based on a plurality of preregistered pedestrian image patterns. The image processing portion 11 also calculates the location of the detected pedestrian (distance from the vehicle, direction of the vehicle and so on) based on the images of the area in front of the vehicle captured by the camera 10, and also specifies locations of the face and eyes of the detected pedestrian. Further, the image processing portion 11 specifies an orientation of the face of the pedestrian based on the specified locations' of the face and eyes of the pedestrian. For example, in a case where two eyes are detected, it may be specified that the face of the pedestrian faces the vehicle directly. In a case where one eye is detected, it may be specified that the face of the pedestrian faces sideways with respect to the vehicle. In a case where no eye is detected, it may be specified that the face of the pedestrian faces an advancing direction of the vehicle. Similarly to detection of a pedestrian, an orientation of a face may be specified in more detail by using a known pattern recognition technology (for example, a face orientation may be classified by angular direction for every 45 degrees or 22.5 degrees and specified) . The image processing portion 11 is connected with the ECU 30 through an on-vehicle LAN and so on so as to be able to communicate with the ECU 30, and outputs information regarding the detected pedestrian (pedestrian information) such as location information of the pedestrian, location information of the face and eyes of the pedestrian, and so on, to the ECU 30.

The location information of the pedestrian outputted from the image processing portion 11 may be corrected based on location information inputted from the distance sensor 20 described later. In short, the location information of the pedestrian outputted from the image processing portion 11 may be location information obtained by fusing the location information based on images captured by the camera 10, and location information by the distance sensor 20 together, in consideration of accuracy of the respective pieces of information, and so on.

A part or all of functions of the image processing portion 11 may be an external processor of the camera 10, and may be, for example, the ECU 30. In this case, the location information of a pedestrian outputted from the later-described distance sensor 20 is inputted to the ECU 30.

The distance sensor 20 is distance detection portion detecting a distance from a vehicle to a pedestrian in front of the vehicle. The distance sensor 20 may be, for example, an ultrasonic sensor, a laser radar, or a millimeter wave radar, which is portion detecting a distance from a pedestrian to the vehicle by sending waves for detecting to an area in front of the vehicle and receiving reflected waves of the wave for detecting. According to the portion, it is possible to determine whether or not reflected waves are waves reflected from a pedestrian based on strength, pattern, and so on of the reflected waves. The distance sensor 20 is connected with the image processing portion 11 through the on-vehicle LAN and so on so as to be able to communicate with the image processing portion 11, and outputs location information of a pedestrian, which contains a detected distance from a vehicle to a pedestrian, to the image processing portion 11 (the camera 10).

In a case where the distance sensor 20 is able to detect a direction of a pedestrian viewed from a vehicle, location information of the pedestrian outputted from the distance sensor 20 may contain information regarding the direction of the pedestrian viewed from the vehicle, in addition to the detected distance from the vehicle to the pedestrian.

The ECU 30 is control portion controlling the headlamps 40. For example, the ECU 30 may be structured by a microcomputer and so on and carry out various types of control processing by executing various programs stored in a ROM on a CPU. As described later, the headlamps 40 are lighting portion, which is able to change a light quantity per irradiation (emission) direction within an irradiation range. Therefore, the ECU 30 carries out control processing (glare protection control) for preventing a pedestrian, irradiated by the later-described headlamps 40, from being dazzled by carrying out control of a light quantity per irradiation direction of the headlamps 40. Details of the glare protection control processing are explained later.

The headlamps 40 are lighting portion irradiating an area in front of a vehicle, and include a headlight 40R arranged on the right side of a vehicle front part, and a headlight 40L arranged on the left side of the vehicle front part. Each of the headlights 40R, 40L may be used as a so-called high beam, or may be used as a low beam, and only needs to be able to irradiate the whole body of a pedestrian in front of a vehicle as explained below. The headlights 40R, 40L are explained collectively as headlamps 40 unless it is necessary to distinguish the headlights 40R, 40L.

The headlamps 40 (the headlights 40R, 40L) are lighting portion capable of drawing on a given projection plane in front of a vehicle, and are structured so as to be able to change a light quantity per irradiation direction within an irradiation range. In short, the headlamps 40 are able to shade brightness (luminance) in each small region on a virtual plane that is perpendicular to an optical axis of the headlamps 40 within the irradiation range. Examples of the structure of the headlamps 40 are explained briefly.

As an example, the headlamp 40 may be structured as projector-type (a mirror element projector-type) lighting portion, in which micromirror elements are used. To be specific, the headlamp 40 includes a lamp as a light source, a mirror device, and a lens. In the mirror device, a large number of micromirror elements are arrayed, and the micromirror elements control reflection directions of light from the lamp. The lens forms an image of light from the mirror device. A tilt angle of each of the micromirrors inside the mirror device is mechanically changed in accordance with an electrical input. Therefore, a reflection direction of light emitted to each of the micromirrors is modulated (shielded, dimmed, and so on) selectively in accordance with the tilt angle of each of the micromirrors, which can be changed selectively.

In the case of this example, the headlamp 40 is provided with a driving device that drives the micromirrors. Then, through the driving device, the ECU 30 is able to control the tilt angle of each of the micromirror elements within the mirror device. Specifically, the ECU 30 may send an image projected in front of a vehicle (an irradiation image) to the driving device as a control command, and the driving device may drive each of the micromirror elements so that the irradiation image is projected in front of the vehicle.

As another example, the headlamp 40 may be structured as liquid crystal projector-type lighting portion. To be specific, the headlamp 40 is provided with a lamp as a light source, a liquid crystal panel, and a lens. In the liquid crystal panel, a large number of liquid crystal elements for controlling transmission of light from the lamp are arrayed. The lens forms an image of light transmitted through the liquid crystal panel. By changing voltage applied to each of the liquid crystal elements within the liquid crystal panel, it is possible to change reflection and transmission states of light entered from the light source. Thus, by changing applied voltage for each of the liquid crystal elements, it is possible to dim and emit light from the light source, or shield the light.

In the case of this example, the headlamp 40 is provided with a driving device for driving the liquid crystal panel (for controlling voltage applied to each of the liquid crystal elements within the liquid crystal panel). Then, the ECU 30 is able to change voltage applied to each of the liquid crystal elements within the liquid crystal panel through the driving device. To be specific, the ECU 30 may send an image projected in front of a vehicle (an irradiation image) to the driving device as a control command, and the driving device may change voltage applied to each of the liquid crystal elements so that the irradiation image is projected in front of a vehicle.

As yet another example, the headlamp 40 may be structured by LED matrix-type lighting portion. To be specific, the headlamp 40 is provided with a LED array, in which a large number of LED chips are arrayed, and a larger number of lenses that form an image of light from the LED array. By changing a current quantity and current supply time for each of the LED chips, it is possible to change a light quantity of each of the LED chips.

In the case of this example, the headlamp 40 is provided with a driving device for driving the LED array. The ECU 30 is thus able to control each of the LED chips within the LED array through the driving device. To be specific, the ECU 30 may send an irradiation image to the driving device as a control command. The irradiation image represents a light quantity for each of the LED chips within the LED array. Then, the driving device may change a current quantity and current supply time for each of the LED chips so that a light quantity of each of the LED chips corresponds to the irradiation image.

The headlamp 40 may be any of the structures stated above. With any of the structures, it is possible to change a light quantity in each irradiation direction within an irradiation range. The structure of the headlamp 40 is not limited to the examples stated above, and any structure may be applied as long as a light quantity can be changed in each irradiation direction within an irradiation range.

The lighting mode changeover switch 50 is a switch for changing lighting modes. The lighting modes include an anti-glare lighting mode and a normal lighting mode. In the anti-glare lighting mode, the headlamp 40 is controlled so as to irradiate the whole body of a pedestrian in front of a vehicle while carrying out glare protection for the pedestrian. In the normal lighting mode, the headlamp 40 is switched to a high beam, a low beam and so on manually, and glare protection for a pedestrian is not carried out. A signal (a switching signal) from the lighting mode changeover switch 50 is inputted to the ECU 30 directly or through another ECU or the like to which the switching signal is inputted directly.

In the vehicle headlamp control device 1 according to this embodiment, visibility of a pedestrian at night for a driver is improved by irradiating the whole body of the pedestrian in the anti-glare lighting mode. At the same time, due to the glare protection control, the pedestrian is prevented from being dazzled.

The luminance sensor 60 is known detection portion detecting darkness (luminance) around a vehicle. To be specific, by detecting luminance of light entering from outside a cabin, the luminance sensor 60 is able to detect luminance around a vehicle (alternatively). Therefore, for example, the luminance sensor 60 may be arranged in a location exposed to light that enters from a windshield in an upper part of an instrument panel inside the cabin. A signal corresponding to luminance detected by the luminance sensor 60 (a luminance signal) is inputted to the ECU 30 directly or through another ECU to which the luminance signal is inputted directly.

The yaw rate sensor 70 is known detection portion detecting rotation angular velocity in a yaw direction of a vehicle (a rotation direction centered about an vertical axis in a vehicle centroid). A signal corresponding to a yaw rate detected by the yaw rate sensor 70 (a yaw rats signal) is inputted to the ECU 30 directly or through another ECU to which the yaw rate signal is inputted directly.

The vehicle speed sensor 80 is known detection portion detecting speed of a vehicle (vehicle speed). A signal corresponding to vehicle speed from the vehicle speed sensor 80 (a vehicle speed signal) is inputted to the ECU 30 directly or through another ECU to which the vehicle speed signal is inputted directly.

The steering angle sensor 90 is known detection portion detecting a steering angle of a steering wheel steered by a driver. A signal corresponding to a steering angle detected by the steering angle sensor 90 (a steering angle signal) is inputted to the ECU 30 directly or through another ECU to which the steering angle signal is inputted directly.

Next, an outline of the glare protection control by the vehicle headlamp control device 1 according to this embodiment is explained.

Figure 2:
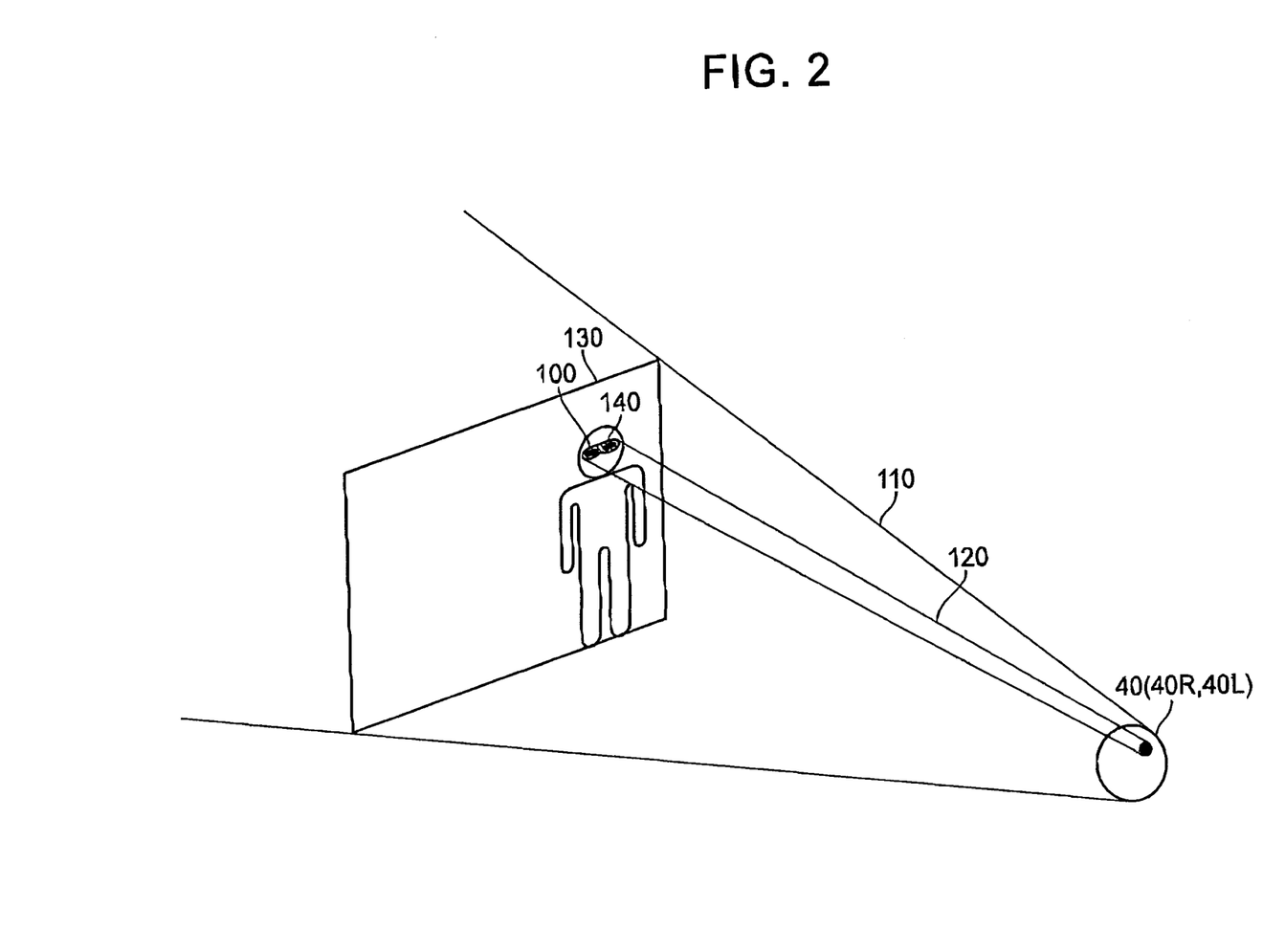
FIG. 2 is a view explaining an example of an anti-glare method for a pedestrian by the vehicle headlamp control device according to the embodiment.

FIG. 2 is a view explaining an example of an anti-glare method for a pedestrian by the vehicle headlamp control device 1 according to this embodiment. To be specific, FIG. 2 shows a state where the whole body of a pedestrian 100 is irradiated by the headlamp 40.

With reference to FIG. 2, the vehicle headlamp control device 1 reduces a light quantity of light 120 in a given irradiation direction (range), light 120 is included in light 110 that is emitted from the headlamp 40 in the entire direction. Then, on a virtual plane 130 perpendicular to an optical axis of the headlamp 40 at a location of (the eyes of) the pedestrian 100, a sunglasses-shaped shadow (a part that is not irradiated or a part irradiated by dimmed light) 140 is formed at a location of the eyes of the pedestrian 100. In other words, the headlamp 40 irradiates the whole body including the face of the pedestrian so that the sunglasses-shaped shadow is formed at the location of the eyes of the pedestrian. Since the eyes of the pedestrians are irradiated by light from the headlamp 40, it is possible to prevent the pedestrian from being dazzled.

In a case where a pedestrian is detected from an image captured by the camera 10 by performing pattern recognition based on a plurality of preregistered pedestrian images, an image pattern of a pedestrian who wears sunglasses on is normally included in the plurality of preregistered image patterns. Therefore, even if the sunglasses-shaped shadow (the part that is not irradiated or the part irradiated by dimmed light) 140 is formed at the location of the eyes of the pedestrian, it is possible to detect the pedestrian 100. In short, it is possible to achieve both detection of a pedestrian based on images captured by the camera 10, and glare protection for a pedestrian, without changing the camera 10 to a special camera that is able to capture infrared, pulsed light and so on.

In a case where a pedestrian is located in an irradiation range that is able to be irradiated by both of the headlights 40R, 40L, each of the headlights 40R, 40L reduces a light quantity of light 120 in a given irradiation direction. Thus, it is possible to form the sunglasses-shaped shadow (the part that is not irradiated or the part irradiated by dimmed light) 140 stated above at a location of the eyes of the pedestrian 100.

Next, specific processing operations for the glare protection control by the vehicle headlamp control device 1 according to this embodiment are explained.

Figure 3A:
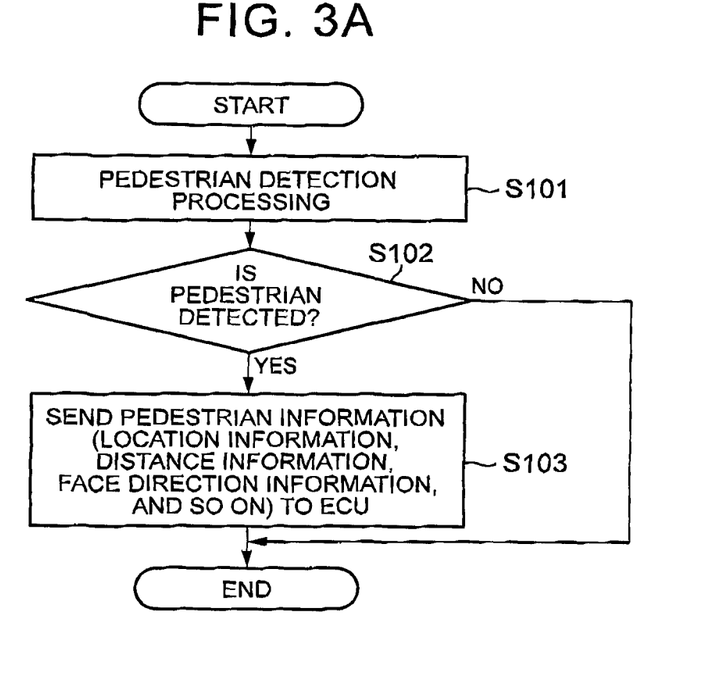
FIG. 3A is a flowchart showing an example of a processing operation of the vehicle headlamp control device according to the embodiment.
Figure 3B:
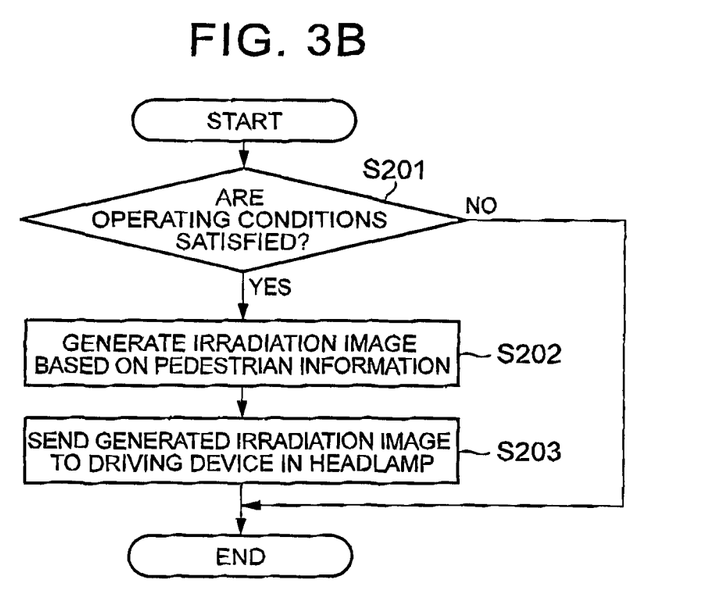
FIG. 3B is a flowchart showing an example of a processing operation of the vehicle headlamp control device according to the embodiment.

FIG. 3A and FIG. 3B are flowcharts showing an example of the processing operations by the vehicle headlamp control device 1 according to this embodiment. To be specific, FIG. 3A is a flowchart showing an example of pedestrian detection processing by the image processing portion 11 inside the camera 10, and FIG. 3B is a flowchart showing an example of glare protection control processing by the ECU 30. The flowchart shown in FIG. 3A is executed every time an image captured by the camera 10 is inputted (for example, in every 1/30 second in a case where 30 frames of images are captured by the camera 10 per second). The flowchart shown in FIG. 3B is executed every time a pedestrian in front of a vehicle is detected by the flowchart shown in FIG. 3A (every time pedestrian information is inputted from the image processing portion 11).

The flowchart shown in FIG. 3B is executed on the assumption that the headlamps 40 are lighted (a switch for lighting the headlamps 40 is turned on).

First of all, with reference to FIG. 3A, pedestrian detection processing is executed in step S101 based on an image of an area in front of a vehicle captured by the camera 10. As stated earlier, a pedestrian is detected from an image of an area in front of a vehicle captured by the camera 10 by performing pattern recognition based on a plurality of pre-registered pedestrian image patterns.

As described earlier, when a pedestrian is detected, the ECU 30 also calculates the location of the pedestrian (distance from a vehicle, direction of the vehicle and so on) based on the image of an area in front of the vehicle captured by the camera 10, and also specifies locations of the face and eyes of the detected pedestrian. Further, the image processing portion 11 specifies a face direction of the pedestrian based on the specified locations of the face and eyes of the pedestrian.

In step S102, it is determined whether or not a pedestrian has been detected. In a case where a pedestrian is detected, the processing moves on to step S103. When no pedestrian is detected, the current processing is ended.

In step S103, pedestrian information (location information of a pedestrian, location information of the face and eyes of the pedestrian, information of a face direction of the pedestrian, and so on) is sent to the ECU 30, and the current processing is then ended.

Next, with reference to FIG. 3B, in step S201, it is determined whether or not operating conditions for glare protection control are satisfied. In a case where the operating conditions are satisfied, the processing moves on to step S202. In a case where the operating conditions are not satisfied, the current processing is ended.

The operating conditions may include whether or not a lighting mode is an anti-glare lighting mode, and the ECU 30 may determine whether or not the operation conditions are satisfied based on an output (a signal) from the lighting mode changeover switch 50. The operating conditions may also include whether or not luminance around a vehicle is at a given value or lower (in short, whether or not the periphery of the vehicle is dark to some extent or more), and the ECU 30 may determine whether or not the operating conditions are satisfied based on a luminance signal from the luminance sensor 60. This is because, in a case where the periphery of the vehicle is light enough, the headlamps 40 do not need to irradiate the whole body including the face of a pedestrian in order to improve visibility for a driver.

In step S202, an irradiation image is generated based on the pedestrian information inputted from the image processing portion 11 inside the camera 10. For example, the location and size of the foregoing sunglasses shape are decided from location information of a pedestrian and location information of the eyes, and a direction of the sunglasses shape is decided from information of a face direction of the pedestrian. Then, an irradiation image, serving as a control command to the driving device in the headlamp 40, is generated.

A vehicle moves while time elapses since an image of an area in front of the vehicle is actually captured by the camera 10 until the headlamps 40 irradiate a pedestrian in accordance with control by the ECU 30, and a relative relation between the vehicle and a pedestrian changes. Therefore, in step S202, the irradiation image (location, size, direction and so on of the sunglasses shape) may be corrected, in consideration of a movement of the vehicle in the elapsed time, based on a yaw rate signal from the yaw rate sensor 70, a vehicle speed signal from the vehicle speed sensor, and a steering angle signal from the steering angle sensor 90.

In step S203, the irradiation image is sent to the driving device in the headlamp 40, and the current processing is thus ended. In other words, the headlamp 40 is controlled through the driving device, and the pedestrian is irradiated so that the aforementioned sunglasses-shaped shadow (a part that is not irradiated or a part irradiated by dimmed light) is formed at the location of the eyes of the pedestrian based on the irradiation image.

The processing by the flowchart in FIG. 3B is executed every time the image processing portion 11 detects a pedestrian based on an image from the camera 10, and the ECU 30 receives the sent pedestrian information. In short, in a case where the image processing portion 11 detects a pedestrian continuously, the flowchart shown in FIG. 3B is executed only per image-capturing cycle of the camera 10. Therefore, after the processing by the flowchart shown in FIG. 3B is ended and until the next processing by the flowchart in FIG. 3B is executed, the ECU 30 corrects the irradiation image at every given time in consideration of a movement of a vehicle, and outputs the corrected irradiation image to the driving device in the headlamp 40. To be specific, the ECU 30 may correct the irradiation image (location, size, direction, and so on of the sunglasses shape) based on a yaw rate signal from the yaw rate sensor 70, a vehicle speed signal from the vehicle speed sensor, and a steering angle signal from the steering angle sensor 90. At this time, a movement of the pedestrian may be estimated based on a history of pedestrian information and so on, which is buffered in an internal storage and so on in the ECU 30, and the correction may be carried out in consideration of the movement of the pedestrian. Thus, it becomes possible to prevent displacement of the shadow (the part that is not irradiated or the part irradiated by dimmed light), which is formed on the face of the pedestrian, from the location of the eyes. It is thus possible to continuously form the sunglasses-shaped shadow at the location of the eyes of a pedestrian while the pedestrian is detected.

As stated so far, the vehicle headlamp control device 1 according to this embodiment controls the headlamps 40 to irradiate a pedestrian so that the sunglasses-shaped part that is not irradiated or irradiated by dimmed light is formed at the location of the eyes of the pedestrian. Thus, it is possible to prevent the pedestrian from being dazzled because the location of the eyes of the pedestrian is not irradiated or irradiated by dimmed light.

In a case where a pedestrian is detected from images captured by the camera 10 by performing pattern recognition based on a plurality of preregistered pedestrian image patterns, the plurality of preregistered image patterns normally includes an image pattern of a pedestrian who wears sunglasses on. Therefore, it is possible to detect a pedestrian even if the sunglasses-shaped part, which is not irradiated or irradiated by dimmed light, is formed at the location of the eyes of the pedestrian.

In short, with the vehicle headlamp control device 1 according to this embodiment, it is possible to achieve both detection of a pedestrian based on images captured by the camera 10, and glare protection for the pedestrian when the headlamps 40 irradiate the pedestrian, without changing the basic performance of the camera 10.

In this embodiment, the sunglasses-shaped shadow (the part that is not irradiated or the part irradiated by dimmed light) is formed at the location of the eyes of a pedestrian. However, a so-called iris of the eye (an iris portion including a pupil of the eye) of the pedestrian may be coincided with the part that is not irradiated or the part irradiated by dimmed light. In short, even if the part that is not irradiated or the part irradiated by dimmed light is formed in the iris portion including the pupil of the eye of the pedestrian, detection of a pedestrian by pattern recognition is not affected because there are many pedestrians having dark (black, brown, and so on) iris portion. Therefore, it is possible to achieve both detection of a pedestrian based on images captured by the camera 10, and glare protection for the pedestrian when the headlamps 40 irradiate the pedestrian, without changing the basic performance of the camera 10. In this case, the image processing portion 11 specifies the location of the iris of the eye (the iris portion including the pupil of the eye) based on the images captured by the camera 10, and outputs the location information of the iris of the eye to the ECU 30 as a part of the pedestrian information.

If an image of a pedestrian, in which the location of the eye is hidden in a given shape other than the sunglasses shape, is previously registered in the pattern images for pedestrian detection by the image processing portion 11, a pedestrian may be irradiated so that a shadow having the given shape is formed at the location of the eyes of the pedestrian. In this case, it is also possible to achieve both detection of a pedestrian based on images captured by the camera 10, and glare protection for the pedestrian when the headlamps 40 irradiate the pedestrian, without changing the basic performance of the camera 10.

In a form where it is possible to detect a pedestrian based on features other than the eyes of the pedestrian, such as an outline of the face, the nose, the mouth, and so on, the pedestrian may be irradiated so that a shadow (a part that is not irradiated or a part irradiated by dimmed light) is formed at the location of the eyes of the pedestrian in a shape that is not registered in the above-mentioned pattern images.

Figure 4A:
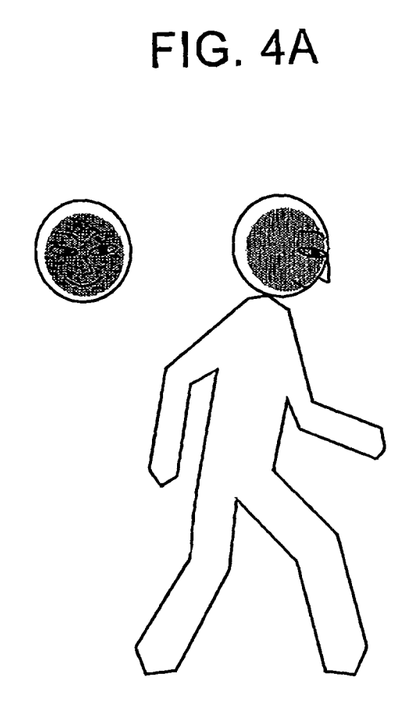
FIG. 4A is a view explaining another example of the anti-glare method for a pedestrian by the vehicle headlamp control device according to the embodiment.
Figure 4B:
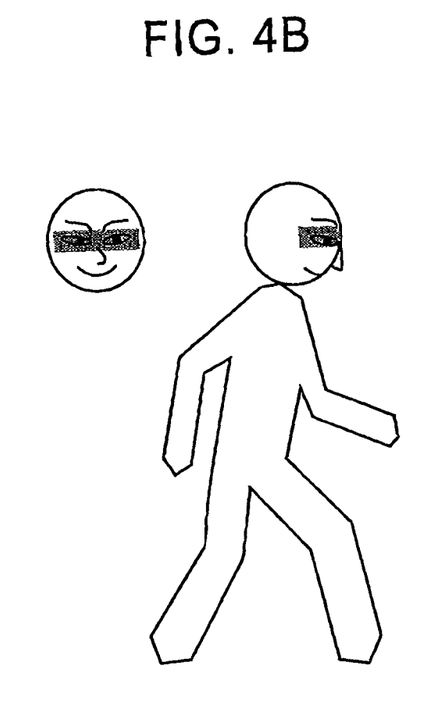
FIG. 4B is a view explaining another example of the anti-glare method for a pedestrian by the vehicle headlamp control device according to the embodiment.

FIG. 4A and FIG. 4B are views explaining another examples of the anti-glare method for a pedestrian by the vehicle headlamp control device 1 according to this embodiment. Specifically, FIG. 4A and FIG. 4B show examples of the shadow (the part that is not irradiated or the part irradiated by dimmed light) formed on the face, including the eyes, of a pedestrian so as not to inhibit detection of the pedestrian based on images captured by the camera 10. FIG. 4A shows an example in which the shadow (the part that is not irradiated or the part irradiated by dimmed light) is formed on all over the face except the outline of the face of the pedestrian (viewed from the camera 10). FIG. 4B shows an example in which the shadow (the part that is not irradiated or the part irradiated by dimmed light) is formed in a given shape (a rectangular shape in the drawing) at the location of the eyes so that the mouth and nose of the pedestrian are irradiated.

FIG. 4A and FIG. 4B show the shadows (the parts that are not irradiated or the parts irradiated by dimmed light) on the face of the pedestrian, which faces the vehicle directly and sideways (to the right), respectively.

In the example shown in FIG. 4A, the shadow (the part that is not irradiated or the part irradiated by dimmed light) is formed in the entire face including the eyes. However, since the outline of the face is irradiated, it is highly likely that the image processing 11 is able to detect the pedestrian based on images captured by the camera 10.

In the example shown in FIG. 4B, the shadow (the part that is not irradiated or the part irradiated by dimmed light) is formed in the given shape at the location of the eyes. However, since the mouth and nose are irradiated, it is highly likely that the image processing 11 is able to detect the pedestrian based on images captured by the camera 10.

In short, a pedestrian is irradiated so that the part that is not irradiated or the part irradiated by dimmed light is formed at the location of the eyes of the pedestrian, and at least one of feature elements of the face (head) of the pedestrian, such as the nose, mouth, ear, and an outline of the face (viewed from the camera 10) of the pedestrian, is irradiated. Thus, it becomes possible to detect the pedestrian based on a feature of the face (head) other than the eyes, and it is possible to achieve both detection of a pedestrian based on images captured by the camera 10, and glare protection for the pedestrian when the headlamps 40 irradiate the pedestrian, without changing the basic performance of the camera 10.

The forms for carrying out the invention have been described in detail. However, the invention is not limited to the specific embodiment, and various modifications and changes may be made without departing from the gist of the invention stated in the scope of claims.

The invention claimed is:

1. A vehicle headlamp control device comprising:
   a headlamp that irradiates an area in front of a vehicle;
   a camera that captures an image of the area in front of the vehicle;
   a pedestrian detection portion configured to detect a pedestrian in front of the vehicle from the image captured by the camera by performing pattern recognition based on a plurality of preregistered pattern images, wherein an image of a pedestrian whose eyes are hidden by a given-shaped part is included in the plurality of preregistered pattern images; and
   a control portion configured to control the headlamp and cause the headlamp to irradiate the pedestrian based on the preregistered pattern image of the pedestrian whose eyes are hidden by the given-shaped part, so that the given-shaped part formed at a location of an eye of the pedestrian is not irradiated, or is irradiated by dimmed light.

2. The vehicle headlamp control device according to claim 1, wherein the headlamp changes a light quantity in each irradiation direction within an irradiation range.

3. The vehicle headlamp control device according to claim 1, wherein the headlamp shields light from a light source and forms the given-shaped part that is not irradiated or the given-shaped part that is irradiated by dimmed light.

4. The vehicle headlamp control device according to claim 1, wherein the headlamp is of a mirror element projector type.

5. The vehicle headlamp control device according to claim 1, wherein the headlamp is of a liquid crystal projector type.

6. The vehicle headlamp control device according to claim 1, wherein the headlamp is of a LED matrix type.

7. The vehicle headlamp control device according to claim 1, wherein an anti-glare lighting mode is included in a lighting mode, in which the headlamp is controlled so as to irradiate a whole body of the pedestrian while carrying out glare protection for the pedestrian in front of the vehicle.

8. A vehicle headlamp control device comprising:
   a headlamp that irradiates an area in front of a vehicle;
   a camera that captures an image of the area in front of the vehicle;
   a pedestrian detection portion configured to detect a pedestrian in front of the vehicle from the image captured by the camera by performing pattern recognition based on a plurality of preregistered pattern images, wherein an image of a pedestrian whose eyes are hidden by a sunglasses-shaped part is included in the plurality of preregistered pattern images; and
   a control portion configured to control the headlamp and cause the headlamp to irradiate the pedestrian based on the preregistered pattern image of the pedestrian whose eyes are hidden by the sunglasses-shaped part, so that the sunglasses-shaped part formed at a location of an eye of the pedestrian is not irradiated or is irradiated by dimmed light, and wherein the control portion is configured to control the headlamp to irradiate a part other than the sunglasses-shaped part on the pedestrian by undimmed light.

9. A vehicle headlamp control device comprising:
   a headlamp that irradiates an area in front of a vehicle;
   a camera that captures an image of the area in front of the vehicle;
   a pedestrian detection portion configured to detect a pedestrian in front of the vehicle from the image captured by the camera by performing pattern recognition based on a plurality of preregistered pattern images, wherein an image of a pedestrian whose iris portion including a pupil of an eye are hidden by a given-shaped part is included in the plurality of preregistered pattern images; and
   a control portion configured to control the headlamp and cause the headlamp to irradiate the pedestrian based on the preregistered pattern image of the pedestrian whose iris portion including the pupil are hidden by the given-shaped part, so that the given-shaped part formed in the iris portion including the pupil in an area of the eye of the pedestrian is not irradiated or is irradiated by dimmed light, and wherein the control portion is configured to control the headlamp to irradiate a part other than the pupil in the area of the eye of the pedestrian by undimmed light.

* * * * *